PATENTED AUG 15 1972 3,684,148

SHEET 2 OF 2

INVENTOR
Hartmut UPMEIER

By
Fleit, Gipple & Jacobson
his ATTORNEYS

EXPANSIBLE TOOLS

This application is a continuation of Ser. No. 736,462, filed June 12, 1968, now abandoned.

The present invention relates to expansible tools for aligning abutting ends of tubes.

When the ends of tubes, e.g. metal pipes, are required to be aligned, e.g. for welding purposes, it may be difficult to align the tubes accurately.

Various expansible tools are known which employ a wedge for expanding jaws radially outwardly against a tube end for expanding the tube end, the tools being so constructed that only a part thereof can fit into the tube end.

It is an object of the present invention to provide a novel and improved expansible tool which can be temporarily secured in position in abutting ends of two tubes and expanded to align accurately the tube end.

In accordance with the present invention, an expansible tool has a wedge movable relative to jaws for expanding the jaws outwardly against the tube ends, and a clamp operable independently of the jaws for temporarily securing the tool in the tube ends by expansion of the clamp against the inner surface of one of the tubes.

According to a further feature of the invention, the tool is provided with guide-wheels which run along the inner surfaces of the tubes for supporting the tool.

Figure 4:
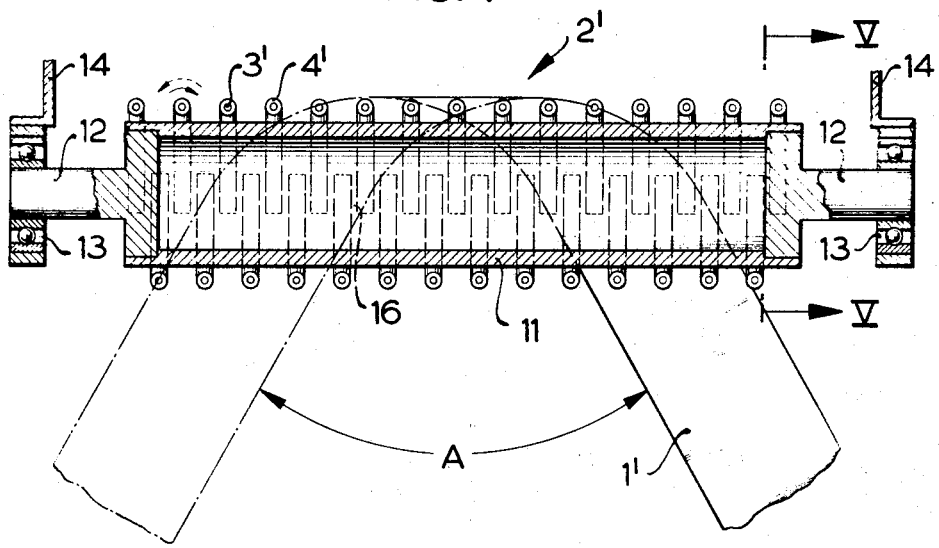
Figure 5:
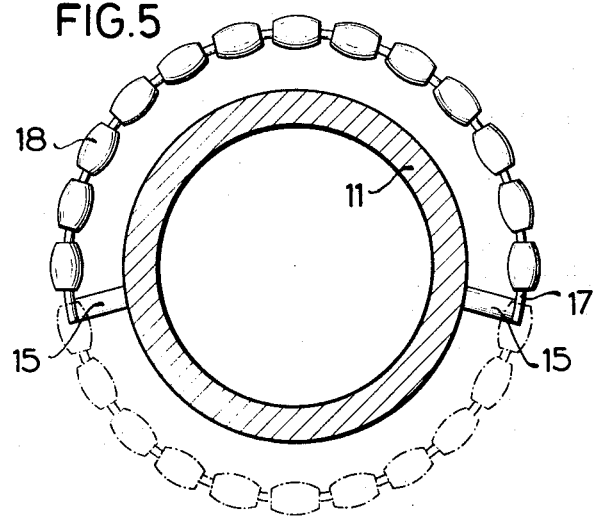
Figure 1:
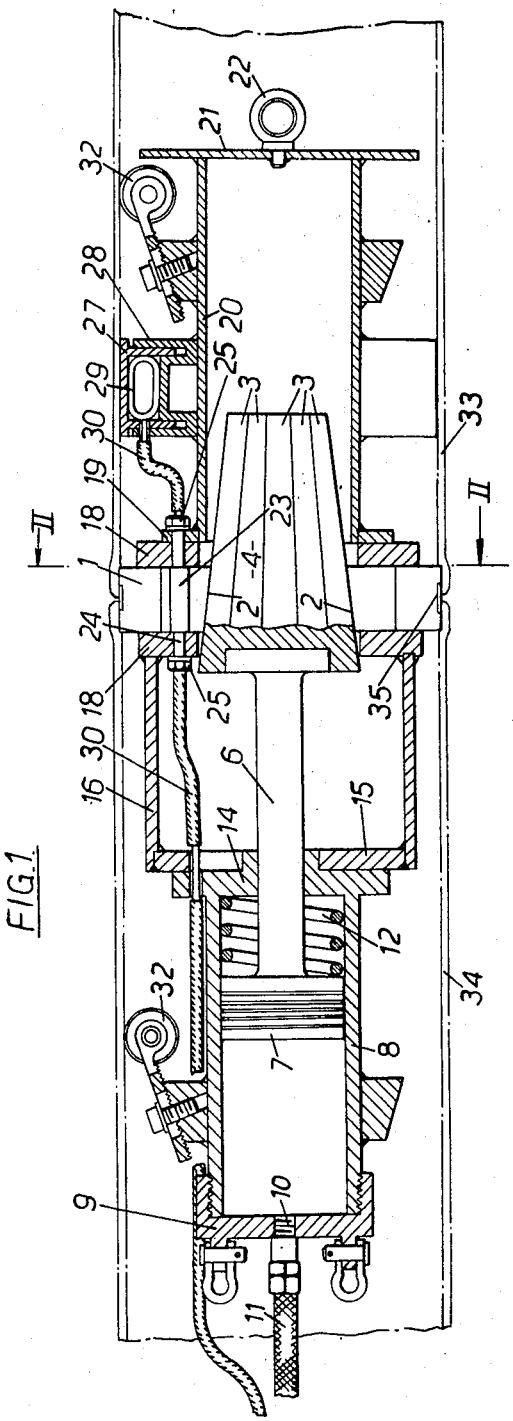
Figure 2:
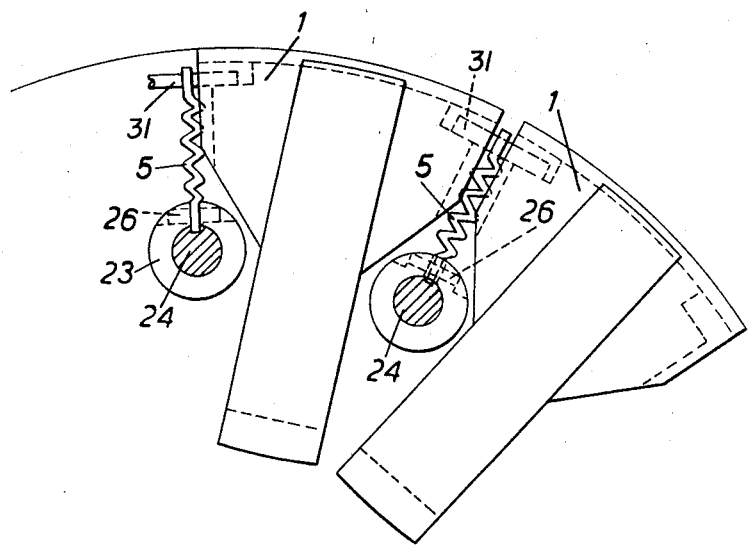

Further objects, features and advantages of the invention will be apparent to those skilled in the art from the following description thereof, given by way of example only, with reference to the accompanying drawings in which:

FIG. 1 shows a view taken in longitudinal section through an expansible tool according to the present invention; and FIG. 2 shows a broken-away view taken in section along the line II — II of FIG. 1.

The tool shown in the drawing has twelve segmental jaws 1 formed with uniformly tapered surfaces 2 seated on uniformly tapered surfaces 3 on a wedge member 4, the surfaces 2 being tapered at the same angle as the surfaces 3. The jaws 1 are biased inwardly towards the wedge member 4 by tension springs 5 as described below, with reference to FIG. 2.

The wedge member 4 is connected by a piston rod 6 to a piston 7 slidable in a cylinder 8 closed at one end by an end cap 9. A flexible oil supply pipe 11 is connected to an inlet port 10 in the end cap 9 for supplying oil under pressure to the interior of the cylinder 8, and a spring 12 is provided in the cylinder 8 for biasing the piston 7 towards the end cap 9.

The end of the cylinder 8 opposite to the end cap 9 is closed by an end plate 14 joined to a further plate 15 at one end of a tube 16. The jaws 1 are slidable between annular plates 18, one of which is joined to the other end of the tube 16, the other annular plate 18 being joined by a smaller annular plate 19 to one end of a tube 20. The other end of the tube 20 is closed by a circular plate 21 provided with an eye bolt 22. The annular plates 18 are connected together by retainer pins 24, which are provided with spacer sleeves 23 and extend between the jaws 1 as shown in FIG. 2 and by nuts 25 on the retainer pins 24. As can also be seen from FIG. 2, the tension springs 5 are each anchored at one end thereof to a respective pin 31 bridging and recessed in an adjacent pair of the jaws 1, and at its other end to a respective pin 26 which is fitted into a transverse opening in one of the spacer sleeves 23 so that the tension springs 5 urge the jaws 1 inwardly against the wedge member 4.

A clamp is provided on the tube 20 and comprises an arcuately curved clamp member 27 slidable radially of the tube 20 in a guide 28, and an inflatable tube 29 between the clamp member 27 and the guide 28, a flexible connection pipe 30 being connected to the tube 29 for supplying compressed air thereto.

The tool is also provided with two sets of three equiangularly spaced adjustably mounted guide wheels 32 on opposite sides of the jaws 1.

In operation, the tool is fitted into a tube 33, which may be the end of a pipe line, and a further tube 34 which is to be welded to the tube 33, the adjacent ends of the tubes 33 and 34 extending around a weld backing ring 35 received in a peripheral annular recess (not shown) in the jaws 1. The tool is then supported by the guide wheels 32 for movement along the inner surfaces of the tubes 33 and 34 to bring the weld backing ring within the abutting ends of the tubes 33 and 34. Compressed air is then supplied through the pipe 30 to inflate the tube 29 and thus move the clamp member 27 outwardly into clamping contact with the inner surface of the tube 33 to clamp the apparatus to the tube 33.

Oil is then supplied under pressure through the oil supply pipe 11 to the cylinder 8 to displace the wedge member 4 to the right, as viewed in the drawing, and thus to move the jaws 1 outwardly.

The adjacent ends of the pipes 33 and 34 are thereby aligned with one another and, if required, expanded, and are then welded.

When the welding is finished, oil is allowed to flow from the cylinder 8 and the spring 12 returns the piston 7 towards the end cap 9 and the jaws 1 move inwardly of the apparatus. The clamp is then released to allow removal of the tool.

What is claimed is:

1. An expansible tool for radially expanding and aligning the ends of a pair of tubes in mutual end-to-end relation, comprising a single wedge means, a pair of annular side plates in fixed spaced apart relation, a single set of jaw members disposed around said wedge means and in axial abutment between said plates contained for radial movement only, said wedge means having a length greater than the distance between said spaced annular plates, a joint backing member extending around said jaw members, radially outwardly movable clamping means for securing said tool relative to one of the pipes by expansion against said pipe, and means for moving said wedge means axially relative to said jaw members, whereby each of said jaw members is radially outwardly wedged against the mutually abutting ends of both of said pipes with said joint backing member overlapping both of said pipe ends.

2. The expansible tool of claim 1, wherein said clamping means comprise an arcuately curved metal clamp member and an inflatable means adapted to expand said metal clamp member against the inside of said one pipe to provide a firm metal to metal contact between the tool and the pipe.

3. A tube expanding and aligning tool as set forth in claim 1, wherein said means for moving said wedge means comprise a piston and cylinder, said piston being connected to said wedge means, and a flexible pipe for supplying fluid to said cylinder.

4. A tube expanding and aligning tool as set forth in claim 1, wherein said single set of jaw members comprises a plurality of separate, radially movable jaws, spring retainers extending between pairs of said jaws, and tension springs mounted between said spring retainers and said plates urging said jaws radially inwardly against said wedge member.

* * * * *

PO-1050
(5/69)

UNITED STATES PATENT OFFICE
CERTIFICATE OF CORRECTION

Patent No. 3,684,149                    Dated August 15, 1972

Inventor(s) Allan R. AMBLER

It is certified that error appears in the above-identified patent and that said Letters Patent are hereby corrected as shown below:

The Assignee should read --BRITISH STEEL CORPORATION, London England--.

Signed and sealed this 26th day of December 1972.

(SEAL)
Attest:

EDWARD M. FLETCHER, JR.
Attesting Officer

ROBERT GOTTSCHALK
Commissioner of Patents